Feb. 18, 1969  B. PERREN  3,428,074
LIQUID DETECTOR
Filed Aug. 25, 1966
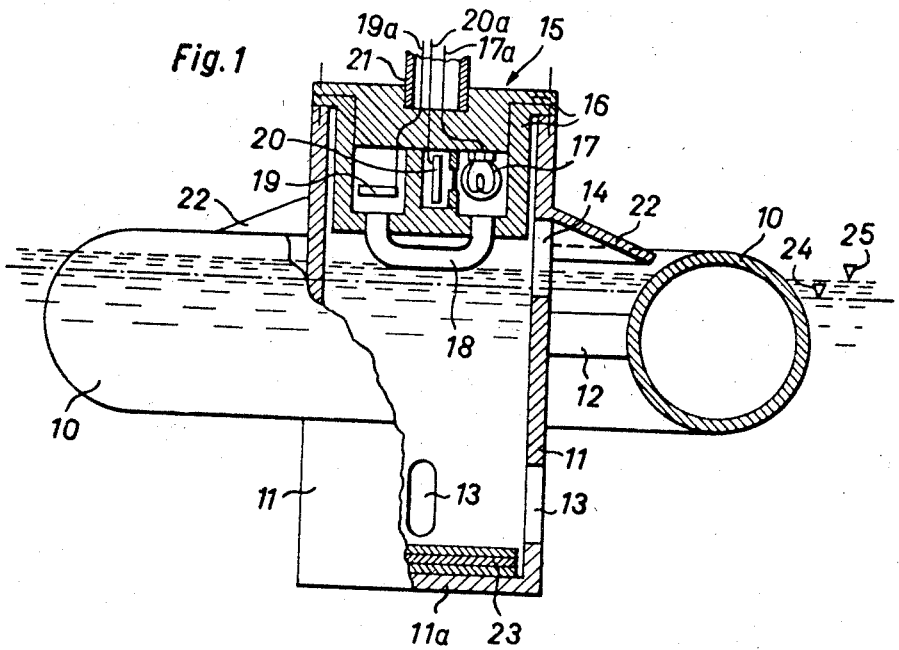
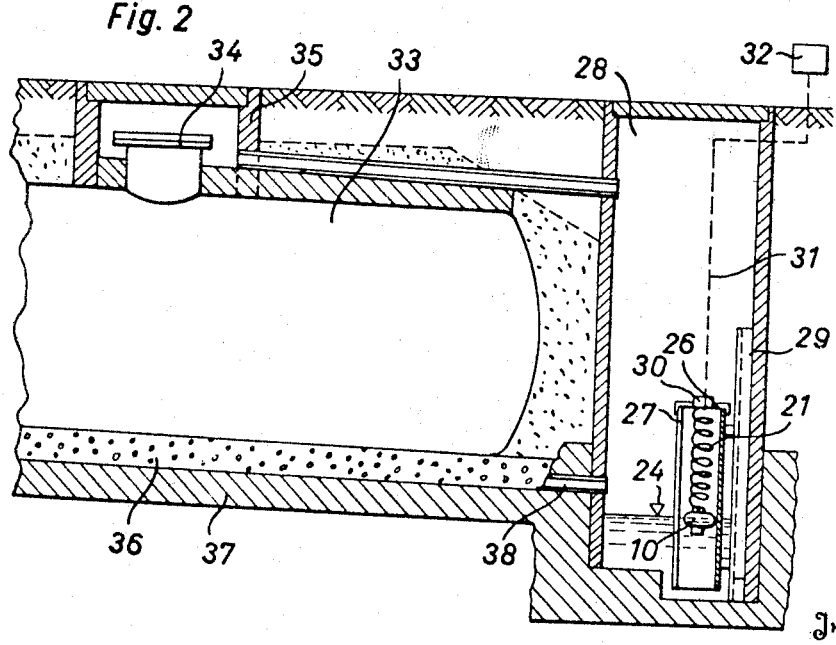
Inventor
Benno Perren
By Pierce, Scheffler & Parker
His Attorney

United States Patent Office 3,428,074
Patented Feb. 18, 1969

3,428,074
LIQUID DETECTOR
Benno Perren, Wettingen, Switzerland, assignor to Hectronic A.G., Aarau, Switzerland, a joint-stock company
Filed Aug. 25, 1966, Ser. No. 575,174
Claims priority, application Austria, Aug. 31, 1965, A 8,002/65
U.S. Cl. 137—312
Int. Cl. F16k 23/00; G01n 9/18; H01h 35/18
10 Claims

ABSTRACT OF THE DISCLOSURE

The present invention relates to the problem of ascertaining the presence (and amount) of a definite liquid particularly in locations which cannot be observed and where liquids other than the one that has to be ascertained may also occur, and is concerned with the provision of apparatus therefor.

---

The problem of ascertaining the presence of, and the amount present, of such liquids occurs, for instance, in connection with storage tanks for liquids which are lighter than water, e.g. liquid oil products such as vegetable oils, fuel oil, gasoline, kerosene, petroleum per se, and the like. Such storage tank installations have to be under supervision, especially in districts where drinking water occurs, so as to be able to ascertain any leakage which might occur in the tanks. Tanks which are underground are, therefore, located in a cement basin which drains into a control shaft or separator. Such cement basin usually is arranged so as to slope downward towards the control shaft, so that any ground water and leakage liquid can flow into the shaft. In order to supervise such a tank installation, a sample of the liquid has to be taken from the shaft periodically and the presence of any leakage liquid ascertained from an observation of such sample.

A continuous control of the shaft liquid heretofore has not been possible, due to the lack of suitable apparatus and devices. A solution of this problem is complicated due to the fact that in such shafts water generally also collects in addition to any leakage liquid. This results in variations in the level of the leakage liquid, and it is necessary—or at least very desirable—to differentiate between two different liquids. Therefore the control device should not give a signal when only water is present, but when a certain amount of leakage liquid is present then an alarm signal should be given. This action should also be guaranteed regardless of the possibility or probability that the water level fluctuates continuously.

An object of the invention is to solve these and similar problems. This is achieved according to the invention which is mainly characterized by the features that a liquid detector is provided which has a feeler mounted on a float which responds when wetted by liquids and sinks in the liquid that has to be controlled, e.g. leakage oil, but swims in liquids having a higher specific weight, e.g. water, so that the feeler is then above the level of the liquid.

Further features and details of the device according to the invention follow from the description of a constructional example shown in the accompanying drawing in which FIG. 1 shows a constructural example of the liquid detector of the device according to the invention partly in elevation and partly in section; and FIG. 2 shows an example of the complete device when used for leakage detection in a tank, the device being shown in sectional elevation.

The liquid detector illustrated in FIG. 1 has a toroidal-shaped float 10 to which a casing 11 is fixed by means of arms 12 in such a manner that the longitudinal axis of the casing 11 is perpendicular to the central plane of the toroidal float. Casing 11 is provided with apertures 13 and 14 which allow liquids to enter and leave freely. Casing 11, which can be cylindrical or prismatic, is closed at the bottom by a plate 11a. A photo-electric feeler 15 which responds to wetting by a liquid is located in the upper part of casing 11. This feeler 15 consists of a casing 16, a light source 17, an arcuate light conductor 18, an optically-sensitive element 19 which responds to changes in the light current coming through the conductor 18, and a further optically-sensitive element 20 which is provided to control the light source 17. The light source 17 and the optically-sensitive elements 19 and 20 are connected to the electrical leads 17a, 19a and 20a respectively which are combined to form a cable 21. The parts 17, 19 and 20 are located inside the casing 16, whilst the light conductor 18 is partly outside the casing 16 but inside casing 11. A metallic shield 22 is fixed to casing 11 in order to prevent any external light from having access to the light conductor 18, there being a small space between it and the toroidal float 10 so that there is a free passage for the liquids. The lower part of casing 11 forms a collecting chamber for adjustment ballast which is for instance in the form of thin metallic discs 23. By adding or removing such ballast, it is possible to vary the submersion depth and the specific weight of the liquid detector so as to correspond to the liquid that has to be supervised.

For most practical applications, the specific weight of the liquid detector is so adjusted that it is less than the specific weight of water but slightly greater than that of the oily liquid that has to be supervised. In this way the liquid detector swims on the water in such a manner that the light conductor 18 is completely above the water level 24. In a liquid of lower specific weight the liquid detector will, however, sink to a greater or lesser extent. If the liquid is for instance, a heating oil having a specific weight of 0.92, then so much ballast 23 is placed in the lower part of casing 11 that the liquid detector sinks in a liquid having a specific weight of 0.925. When heating oil collects on the surface 24 of the water, the liquid detector does not rise to a corresponding extent, so that the light conductor 18 is wetted when the oil reaches the level 25. At the wetted part of the light conductor 18 the difference between the refraction indexes inside and outside the conductor is considerably reduced, so that the major part of the light current passes into the liquid and only a smaller amount of light reaches the optically-sensitive element 19. This results in a change in the electric current in the electrical conductor 19a which can be used to actuate a registering, control, or alarm device.

An arrangement for utilizing the liquid detector for the leakage supervision of an underground tank containing liquid oil products is shown in FIG. 2. The liquid detector together with float 10 is located with clearance in a vertical pipe 26. This pipe has a longitudinal slot 27, so that the levels 24 and 25 of the liquids in the pipe correspond to those outside the pipe. Pipe 26 is located in a shaft 28 and fixed to the wall of the shaft by way of a rail 29, so that its position in the vertical direction can be varied. To enable the liquid detector to move easily up and down in pipe 26 depending on the water level 24, cable 21 is in the form of an extensible coil. The upper end of cable 21 is fixed to a terminal 30 at the top of pipe 26 which is connected by an ordinary cable 31 to a registering, control, or alarm device 32. The height of pipe 26 is so adjusted that cable 21 exerts very little pressure on float 10 or upward pull when the water level 24 is at the mean level of the fluctuation range.

Shaft 28 is in the immediate vicinity of underground tank 33 in which heating oils, petroleum, gasoline or other oily liquids are stored. Tank 33 is provided with a small shaft 35 which leads to an opening 34 that is normally closed, and the tank rests on a layer 36 of gravel or pebbles which is located in a liquid-tight cement basin 37. This basin is inclined slightly downward towards shaft 28 and hence conducts any rainwater and any liquid, which escapes from tank 33 due to a leak, through a conduit 38 into shaft 28. It is expedient if shaft 28 has a restricted cross-section at the bottom up to a certain height so that it can just accommodate the pipe 26. As a result, the liquid detector soon responds when a leak occurs and there is no water in shaft 28.

The method of operation of the leakage detection device is as follows. If there is no liquid or only water in shaft 28, then the light conductor 18 (FIG. 1) will remain dry, so that practically the entire light current passes through the light conductor 18 to the light-sensitive element 19. When the water level 24 fluctuates, float 10 keeps the liquid detector 15 always slightly above the water level as has already been described. If due to a leak in the tank 33 oily liquid escapes, this latter will also collect in shaft 28 and, due to its lower specific weight, will form a layer on the surface of the water. The specific weight of the liquid detector is, however, somewhat greater than that of the leakage liquid that has to be supervised. The float 10 thus sinks somewhat in the leakage liquid and this causes the light conductor 18 to be wetted, so that a registering, control, or alarm device 32 comes into operation. This method of operation is independent of the height of the water level 24, this being an important advantage of the device.

An important feature in connection with the method of operation described is the fact that the float 10 is a toroidal-shaped body. It prevents the leakage liquid which occurs outside the ring at first from having access to the space within the float and also to the light conductor 18. According to the principle of communicating tubes, the water level within the ring will, however, rise nearly up to the level 25 of the leakage liquid outside the ring or float 10, only a small difference remaining corresponding to the difference between the specific weight of the water and that of the lighter leakage liquid. Thus it is possible that when there is a sufficient amount of leakage liquid the light conductor 18 is not wetted by the liquid but by the water and remains clean. This (under certain conditions, favorable) feature of the device can be assured by a special shape of annular float 10 or by providing a closed vertical protective collar on the upper side of the float.

The feeler 15 need not necessarily be an optically sensitive element. Instead of a light conductor 18, it is possible to use a temperature-dependent resistor which serves as a feeler and is electrically heated, whereby its temperature and thus its resistance value varies as it is wetted by the liquid.

What I claim is:
1. Apparatus for ascertaining the presence of a certain liquid to be controlled, particularly at a point which cannot be observed, characterized by a liquid detector which comprises a float, and a feeler mounted on said float, which feeler responds to the wetting effect of a liquid and which float has a specific weight that is adjustable whereby the feeler sinks in the liquid which is to be controlled but is maintained above the level of liquids which have higher specific weights.

2. Apparatus defined in claim 1, in which the float is a toroidal body, the feeler being held above the center of said float by means of supporting arms extending from the float.

3. Apparatus defined in claim 2, in which the float is associated with a storage chamber which when in service lies below the center of gravity of the float and serves to accommodate adjustment ballast.

4. Apparatus defined in claim 1, in which the feeler includes a photo-electric member which is connected by a flexible cable to the terminal of an electric signalling and/or registering device.

5. Apparatus defined in claim 4, in which the photo-electric feeler member includes a light conductor and is located in a casing provided with openings for the entrance and discharge of liquids and has a shield for preventing access of external light to the light conductor of the photo feeler member.

6. Apparatus defined in claim 3, in which the feeler includes a photo-electric member and a casing therefor, and in which the storage chamber for the ballast and the casing for the photo-electric member of the feeler form together a unit which is arranged coaxially with the toroidal float.

7. Apparatus defined in claim 1, in which the liquid detector is arranged within a vertical guide pipe which is provided with a longitudinal slot for the passage of liquids.

8. Apparatus defined in claim 1, in which the specific weight of the liquid detector is adjustable so as to be between the specific weight of water and the specific weight of an oily liquid that has to be controlled.

9. Apparatus defined in claim 8, in which the liquid detector is arranged in a shaft next to an oil storage tank which has to be controlled for leakages, said shaft being in communication with a collecting chamber underneath said tank.

10. Apparatus defined in claim 1, further characterized in that said feeler comprises a light source, an arcuate light conductor, a light sensitive element disposed in the path of light rays exiting from said arcuate light conductor, means operatively associated with said light sensitive element for measuring electric current emitted by said light sensitive element, said arcuate light conductor being so disposed with regard to said float that a part of said conductor, intermediate its ends, when wetted by partial immersion in a liquid tends to pass light rays into such liquid instead of to said light sensitive element.

References Cited

UNITED STATES PATENTS

| 1,708,033 | 4/1929 | Short | 340—236 XR |
| 2,050,521 | 8/1936 | Chapin | 200—61.04 XR |
| 2,717,990 | 9/1955 | Person | 340—244 XR |
| 2,839,742 | 6/1958 | Sumner | 340—242 |

FOREIGN PATENTS 1,126,208  3/1962  Germany.

WILLIAM F. O'DEA, Primary Examiner.

R. GERARD, Assistant Examiner.

U.S. Cl. X.R.

137—172, 551; 200—61.04, 84; 116—118; 73—32; 340—236, 242, 244